United States Patent
Hayashi et al.

(10) Patent No.: US 7,226,544 B2
(45) Date of Patent: Jun. 5, 2007

(54) MAGNETITE PARTICLES

(75) Inventors: Tomio Hayashi, Tamano (JP); Hiroyuki Shimamura, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 196 days.

(21) Appl. No.: 10/500,935

(22) PCT Filed: Jun. 9, 2003

(86) PCT No.: PCT/JP03/07271

§ 371 (c)(1), (2), (4) Date: Jul. 8, 2004

(87) PCT Pub. No.: WO03/104150

PCT Pub. Date: Dec. 18, 2003

(65) Prior Publication Data

US 2005/0051753 A1    Mar. 10, 2005

(30) Foreign Application Priority Data

Jun. 10, 2002 (JP) ............................. 2002-169103

(51) Int. Cl.
- C01G 49/08 (2006.01)
- H01F 1/11 (2006.01)
- G03G 9/083 (2006.01)

(52) U.S. Cl. .................... 252/62.56; 423/632

(58) Field of Classification Search .................... None
See application file for complete search history.

(56) References Cited

U.S. PATENT DOCUMENTS 5,885,740 A * 3/1999 Tokunaga et al. ....... 430/111.31

FOREIGN PATENT DOCUMENTS

| | | |
|---|---|---|
| JP | 1-057602 | 3/1989 |
| JP | 09-059024 | 3/1997 |
| JP | 10-101339 | 4/1998 |

* cited by examiner

*Primary Examiner*—C. Melissa Kolsow
(74) *Attorney, Agent, or Firm*—Young & Thompson

(57) ABSTRACT

Magnetite particles (and their manufacturing method) that enable suppression of blooming caused because of their large coercive force when used as magnetic toner, exert a light environment load, and are excellent in cost. The magnetite particles contain 0.1 to 1 mass % of phosphorus, have a coercive force of 10 to 25 kA/m at a load magnetic field of 796 kA/m, and have a shape of octahedron.

10 Claims, No Drawings

MAGNETITE PARTICLES

TECHNICAL FIELD

The present invention relates to magnetite particles and, more specifically, magnetite particles which are characterized by their high coercivity and their octahedral shape and are particularly useful as a powder material for magnetic toners for MICR printers or for electrostatic copying.

BACKGROUND ART

Particulate magnetite obtained by aqueous solution reaction and the like is widely utilized as a powder material in various fields, especially of magnetic toners for MICR printers or dry electronic copiers and printers. Checks, securities, tickets, etc. are printed with identification marks called fonts in order to prevent forgery or alteration. The identification marks are printed in magnetic ink having a given amount of magnetic powder dispersed in a binder. The magnetic force of the magnetic powder is made use of to read the identification marks, fonts, with a special reader to give information, with which to distinguish between authenticity and inauthenticity of checks, etc. accurately. In applications to magnetic toners, magnetite particles are required to satisfy various general characteristics for development. The recent development of electrophotography has boosted rapid development particularly of copiers and printers using digital technologies, and the demands for magnetite particles with higher performance have ever been increasing.

For MICR application, toners capable of providing an increased print density and enhanced reading accuracy have been studied. Of development processes in electronic copying, development with a one-component developer, i.e., magnetite particles dispersed in a resin, is adapted widely. Today, magnetic toners used in electrostatic development, too, have been required to fulfill various characteristics to cope with the advanced performance of equipment in terms of size, precision, speed, and the like. In particular, a magnetic toner which causes little fog and achieves high resolution with excellent fine line reproducibility has been awaited.

It is required for an MICR toner to have an increased coercive force for increasing print density and improving reading accuracy. Magnetic particles as a powder material of magnetic toners are required to have a high residual magnetization and a high coercive force for suppressing fog. The related art is described in JP-A-59024.

JP-A-9-59024 refers to magnetite particles having high coercivity including those having an octahedral shape and those having a small particle size (or a large specific surface area).

However, the approach using octahedral particles encounters a limit on achievable coercivity, and the one relying on particle size reduction also has a limit because fine particles are liable to agglomerate heavily and difficult to disperse in toner preparation or inferior in blackness.

Among other proposals so far disclosed for increasing coercivity of magnetite particles are addition of a specific heavy metal, e.g., cobalt, heat treatment, compaction, and use of acicular particles with magnetic anisotropy. Taking into consideration the recent tendency to avoid use of environmentally unfriendly substances as well as economy, the state-of-the-art magnetite particles are still unsatisfactory in terms of higher coercivity, reduced environmental burden, and cost. For application to MICR toners, in particular, highly coercive acicular particles are usually used in a toner as a mixture with blackish isotropic particles, in which case the acicular particles are apt to be broken, or the resulting toner is poor in blackness.

DISCLOSURE OF THE INVENTION

Accordingly, an object of the present invention is to provide magnetite particles which have a high coercive force and therefore provide an increased print density and improved read accuracy when used in MICR toners or cause little fog when used in magnetic toners, have reduced environmental burdens, and are produced economically.

As a result of extensive investigations, the present inventors have found that the above object is accomplished by octahedral magnetite particles containing phosphorus and having a specific coercive force.

The magnetite particles of the present invention, completed based on the above finding, are characterized by containing 0.1 to 1% by mass, having a coercive force of 10 to 25 kA/m in an applied magnetic field of 796 kA/m, and having an octahedral shape.

BEST MODE FOR CARRYING OUT THE INVENTION

The present invention will be described with reference to the embodiments in practice. The magnetite particles according to the present invention include not only magnetite particles but particles comprising magnetite ($Fe_3O_4$) as a main component and, in addition, maghemite ($\gamma$-$Fe_2O_3$) or its berthollide compounds having an intermediate composition ($FeO_x \cdot Fe_2O_3$, $0<x<1$) or spinel type ferrite particles comprising such a single or a complex compound and at least one element other than Fe selected from Si, Al, Mn, Ni, Zn, Cu, Mg, Ti, Co, Zr, W, Mo, etc. The component other than magnetite is selected according to the characteristics required while considering the environmental burdens. Particles with a higher content of $Fe^{2+}$ are preferred for their high blackness.

The magnetite particles of the present invention may be coated with an Si or Al compound layer or surface treated with an organic treating agent, etc. to have increased dispersibility.

The magnetite particles of the present invention are characterized by containing 0.1 to 1% by mass of phosphorus, having a coercive force of 10 to 25 kA/m in an applied magnetic field of 796 kA/m, and having an octahedral shape.

It is important for the magnetite particles of the present invention to contain 0.1 to 1% by mass of phosphorus so as to have an increased coercive force. Related art includes a technique involving addition of phosphorus to magnetic iron oxide for magnetic recording application. The addition is aimed to prevent magnetic iron oxide from sintering when heat treated. The mechanism is this: the magnetic iron oxide maintains its acicular shape to gain in magnetic anisotropy, which results in an increase of coercivity.

In contrast the mechanism according to the present invention is considered to be as follows. Being octahedral, i.e., isotropic and having phosphorus present in the inside, the magnetite particles approach a single magnetic domain structure and increase in coercive force. If the phosphorus content is less than 0.1% by mass, the effect in increasing coercive force is unsatisfactory. A phosphorus content more than 1% by mass results in adverse influences on saturation magnetization and the like.

The magnetite particles of the present invention are characterized by having a relatively high coercive force. As stated previously, when used in a magnetic toner, the magnetite particles of the present invention suppresses fog because of the high coercive force. Specifically, it is important for the magnetite particles to have a coercive force of 10 to 25 kA/m in an applied magnetic field of 796 kA/m. The coercive force in an applied magnetic field of 79.6 kA/m is preferably 10 to 20 kA/m.

With a coercive force less than 10 kA/m, the fog preventive effect is insubstantial. A coercive force exceeding 25 kA/m leads to an excessively high residual magnetization to cause appreciable magnetic agglomeration, which will impair dispersibility of the particles in toner preparation and other characteristics. From this standpoint, a preferred residual magnetization is 10 to 25 $Am^2/kg$ in an applied magnetic field of 796 kA/m and 10 to 20 $Am^2/kg$ in an applied magnetic field of 79.6 kA/m.

It is essential for the magnetite particles of the present invention to have an octahedral shape. As described above, "being octahedral" and "containing phosphorus" produce synergism in achieving high coercivity even if the magnetite particles have a relatively large particle size (or a relatively small specific surface area) and a relatively low coercive force. Gamma-iron oxide, which has a high coercive force, is unsuitable for applications to black toners for MICR or magnetic toners for electrostatic copying on account of its poor color. Acicular magnetite particles are economically disadvantageous because the production involves such steps as a redox step.

The magnetite particles of the present invention exhibit high coercivity even where they have an average particle size of 0.05 to 0.3 μm, which is a generally employed range. The particle size may be out of this range of course. However, too large particles tend to be insufficient in tinting power or hiding power, and too small particles are liable to agglomerate and be difficult to disperse. While a specific surface area of particles is not always correlated with the average particle size, it is desirable for the magnetite particles of the present invention to have a specific surface area of about 4 to 15 $m^2/g$, which is suitable as a powder material of electrostatic copying magnetic toners.

A preferred process for producing the magnetite particles of the present invention will then be described. The magnetite particles of the present invention can be produced by a process comprising mixing an aqueous solution of a ferrous salt and an alkali solution for neutralization to obtain a ferrous hydroxide slurry and oxidizing the ferrous hydroxide to obtain iron oxide particles with alteration that a water-soluble phosphorus compound is added to the reaction system in any stage from the beginning to the end of the oxidation reaction in an amount to give the resulting magnetite particles a phosphorus content of 0.1 to 1% by mass.

What is important here is to add a water-soluble phosphorus compound to the reaction slurry during the period of from the beginning to the end of the oxidation reaction for the following reason. As long as a water-soluble phosphorus compound is added during the oxidation reaction, it is believed that phosphorus is evenly distributed in the magnetite particle, which helps phosphorus to manifest its effect. Because magnetite nuclei must be formed in the initial stage of oxidation, it is preferred that addition of water-soluble phosphorus be started when the ratio of unreacted iron to the total iron content is between 95% and 20% after the beginning of the oxidation reaction. Seeing that phosphorus fails to be incorporated into magnetite unless addition completes by the end of the oxidation reaction, it is preferred that the reaction completes when the ratio of unreacted iron to the total iron content is between 80% and 0%.

For obtaining octahedral magnetite particles and also from economical considerations, it is preferred that the amount of the alkali solution to be added to the ferrous salt aqueous solution for neutralization be 1.01 to 2 equivalents to the ferrous salt. The oxidation is preferably carried out at 50 to 95° C. from the standpoint of productivity, magnetite formation, and cost. The water-soluble phosphorus compounds which can be used in the present invention include phosphoric acid salts, such as sodium phosphate, potassium phosphate, and primary ammonium phosphate, orthophosphoric acid, and phosphorous acid.

The present invention will now be illustrated in greater detail with reference to Examples.

EXAMPLE 1

Fifty liters of a 2 mol/l aqueous solution of ferrous sulfate and 41.2 l of a 5 mol/l aqueous solution of sodium hydroxide were mixed to obtain a ferrous hydroxide slurry. The ferrous hydroxide slurry was maintained at a temperature of 85° C., and air was bubbled through the slurry at a rate of 15 l/min to start oxidation. When the oxidation reaction proceeded to a point corresponding to 10% of the total $Fe^{2+}$, an additive prepared by dissolving 53 g of orthophosphoric acid in 5 liters of city water was slowly added at a rate of 2.5 l/hr. The resulting slurry containing magnetite particles was filtered, and the filter cake was washed, dried, and ground in a usual manner to obtain magnetite particles. The resulting magnetite particles were evaluated for properties and various characteristics in accordance with the methods described below. The results obtained are shown in Table 1.

Methods of Evaluation:

(1) Phosphorus, Iron, and FeO Contents

A sample dissolved in an acid was analyzed by ICP to determine the phosphorus content and the iron content. A sample dissolved in sulfuric acid was analyzed by oxidation-reduction titration with a standardized potassium permanganate solution to determine the FeO content.

(2) Average Particle Size

The shape of particles was observed under a scanning electron microscope. A micrograph was taken at a magnification of 40,000 times, and the Feret's diameters of 200 particles were measured to calculate an average particle size.

(3) Specific Surface Area

Measured with a BET specific surface area analyzer, Micromeritics 2200 supplied by Shimadzu Corp.

(4) Magnetic Characteristics (Saturation Magnetization, Residual Magnetization, and Coercive Force)

Measured with a vibrating sample magnetometer, VSM-P7 manufactured by Toei Industry Co., Ltd., in an external magnetic field of 796 kA/m and 79.6 kA/m.

EXAMPLE 2

Magnetite particles were produced in the same manner as in Example 1, except for changing the amount of orthophosphoric acid added to 10 liters. The properties and various characteristics were measured in the same manner as in Example 1. The results obtained are shown in Table 1.

EXAMPLE 3

Magnetite particles were produced in the same manner as in Example 1, except that the additive was added at a rate of 10 l/hr when the oxidation reaction proceeded to a point corresponding to 60% of the total $Fe^{2+}$. The properties and various characteristics were measured in the same manner as in Example 1. The results obtained are shown in Table 1.

EXAMPLE 4

Magnetite particles were produced in the same manner as in Example 1, except for changing the amount of orthophosphoric acid added to 15 liters. The properties and various characteristics were measured in the same manner as in Example 1. The results obtained are shown in Table 1.

EXAMPLE 5

Magnetite particles were produced in the same manner as in Example 1, except for changing the amount of orthophosphoric acid added to 20 liters. The properties and various characteristics were measured in the same manner as in Example 1. The results obtained are shown in Table 1.

COMPARATIVE EXAMPLE 1

Magnetite particles were produced in the same manner as in Example 1, except for changing the amount of orthophosphoric acid added to 1.3 liters. The properties and various characteristics were measured in the same manner as in Example 1. The results obtained are shown in Table 1.

COMPARATIVE EXAMPLE 2

Magnetite particles were produced in the same manner as in Example 1, except for changing the amount of orthophosphoric acid added to 30 liters. The properties and various characteristics were measured in the same manner as in Example 1. The results obtained are shown in Table 1.

they provide an increased print density and assure enhanced read accuracy when used in an MICR toner or they are capable of reducing fog when used in a magnetic toner. Moreover, they offer advantages of reduced environmental burden and low cost. Thus, the magnetite particles of the present invention are suited for use as a powder material for an MICR toner and a magnetic toner for electrostatic copying.

The invention claimed is:

1. Magnetite particles comprising 0.1 to 1% by mass of phosphorus, wherein, said particles have a coercive force of 10 to 25 kA/m in an applied magnetic field of 796 kA/m and an octahedral shape.

2. The magnetite particles according to claim 1, wherein said particles have an average particle size of 0.05 to 0.3 µm.

3. The magnetite particles according to claim 1, wherein said particles have a coercive force of 10 to 20 kA/m in an applied magnetic field of 79.6 kA/m.

4. The magnetite particles according to claim 1, wherein said particles have a residual magnetization of 10 to 20 Am2/kg in an applied magnetic field of 79.6 kA/m.

5. Magnetite particles comprising:
  0.1 to 1% by mass of phosphorus;
  a residual magnetization of 10 to 20 Am2/kg in an applied magnetic field of 79.6 kA/m; and
  an octahedral shape.

6. The magnetite particles according to claim 5, wherein said particles have a coercive force of 10 to 25 kA/m in an applied magnetic field of 796 kA/m.

TABLE 1

| | | Avg. Particle Size (µm) | BET ($m^2$/g) | Magnetic Characteristics (796 kA/m) | | | Magnetic Characteristics (79.6 kA/m) | | | Chemical Components | | | Shape |
|---|---|---|---|---|---|---|---|---|---|---|---|---|---|
| | | | | σs (Am$^2$/kg) | σr (Am$^2$/kg) | Hc (kA/m) | σs (Am$^2$/kg) | σr (Am$^2$/kg) | Hc (kA/m) | Fe (mass %) | FeO (mass %) | P (mass %) | |
| Example | 1 | 0.25 | 6.3 | 88.4 | 13.6 | 13.2 | 60.0 | 11.7 | 11.8 | 71.2 | 29.5 | 0.21 | octa-hedral |
| | 2 | 0.19 | 8.8 | 84.3 | 18.9 | 19.1 | 55.0 | 14.6 | 16.2 | 70.7 | 29.2 | 0.40 | octa-hedral |
| | 3 | 0.22 | 7.1 | 83.5 | 12.1 | 11.6 | 59.7 | 11.4 | 11.1 | 71.0 | 28.6 | 0.40 | octa-hedral |
| | 4 | 0.19 | 9.1 | 82.0 | 22.3 | 23.7 | 53.0 | 16.0 | 19.3 | 70.9 | 28.2 | 0.60 | octa-hedral |
| | 5 | 0.15 | 12.0 | 81.0 | 24.0 | 24.6 | 52.0 | 19.7 | 19.8 | 70.5 | 26.8 | 0.80 | octa-hedral |
| Comp. Example | 1 | 0.26 | 6.2 | 86.9 | 8.0 | 6.7 | 62.0 | 7.0 | 6.3 | 70.3 | 29.3 | 0.06 | octa-hedral |
| | 2 | 0.18 | 9.0 | 78.4 | 25.1 | 26.1 | 46.0 | 20.3 | 21.5 | 69.7 | 24.5 | 1.21 | octa-hedral |

As is apparent from Table 1, the magnetite particles of Examples, having phosphorus uniformly distributed therein and having an octahedral shape, exhibit sufficiently high coercivity and residual magnetization which are suitable characteristics for use as an MICR toner and a powder material for a magnetic toner.

In contrast, the magnetite particles of Comparative Example 1 have too small a phosphorus content and exhibit low levels of coercive force and residual magnetization. The magnetite particles of Comparative Example 2, on the other hand, have too large a phosphorus content. Although their coercive force and residual magnetization are sufficiently high, their saturation magnetization is low. That is, the magnetic characteristics are out of balance.

INDUSTRIAL APPLICABILITY:

As described above, the magnetite particles according to the present invention have a high coercive force, whereby 7. The magnetite particles according to claim 5, wherein said particles have a coercive force of 10 to 20 kA/m in an applied magnetic field of 79.6 kA/m.

8. Magnetite particles comprising:
  0.1 to 1% by mass of phosphorus;
  a specific surface area of 8.8 to 15 m2/g;
  a residual magnetization of 14.6 to 20 Am2/kg in an applied magnetic field of 79.6 kA/m; and an octahedral shape.

9. The magnetite particles according to claim 8, further comprising a residual magnetization of 18.9 to 25 Am2/kg in an applied magnetic field of 796 kA/m.

10. The magnetite particles according to claim 8, further comprising a coercive force of 19.1 to 25 kA/min in an applied magnetic field of 796 kA/m and a coercive force of 16.2 to 20 kA/min in an applied magnetic field of 79.6 kA/m.

* * * * *